Figure 1:
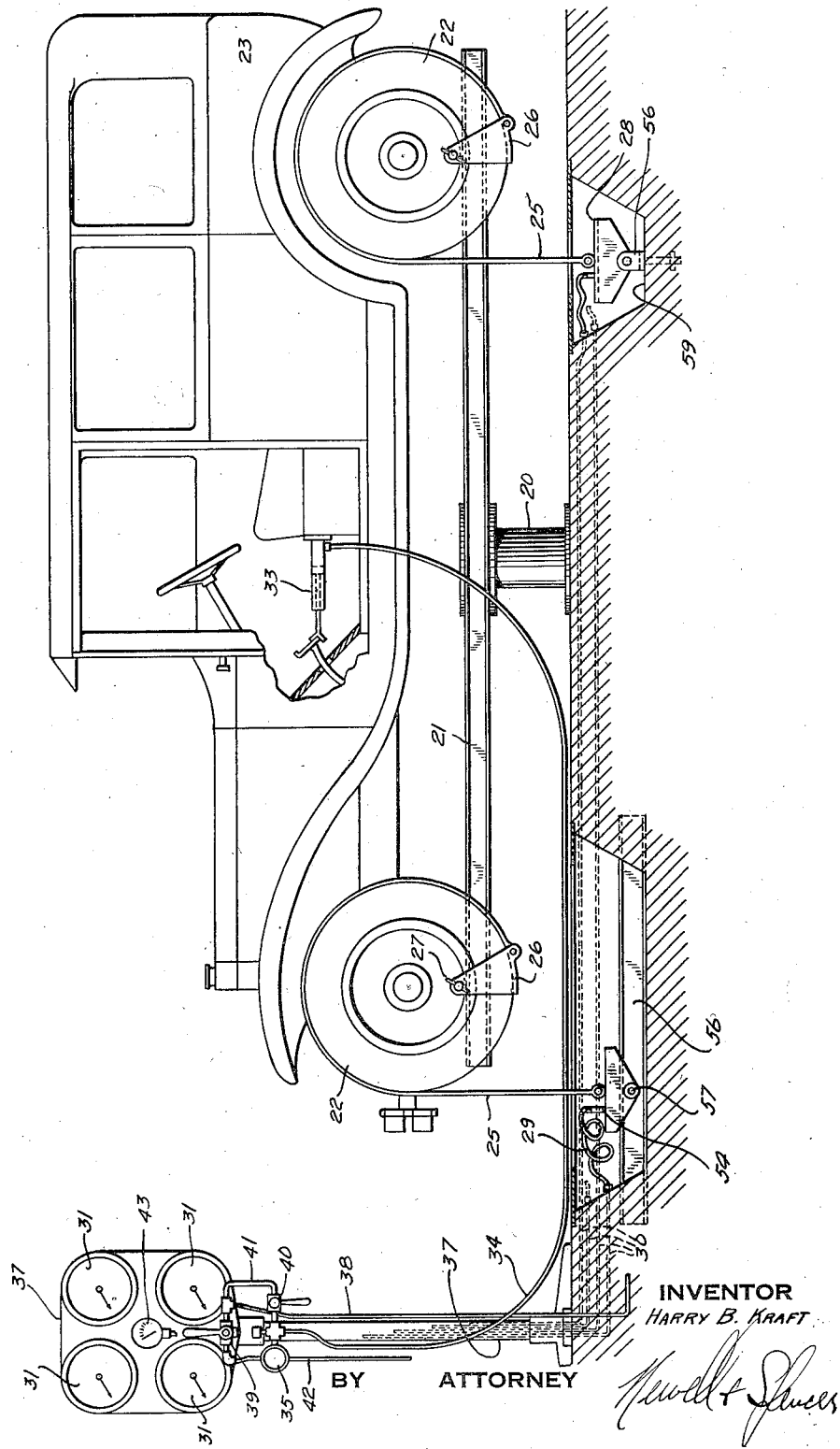

Oct. 22, 1935.     H. B. KRAFT     2,018,451
BRAKE TESTER
Filed June 30, 1931     6 Sheets-Sheet 1

INVENTOR
HARRY B. KRAFT
BY ATTORNEY

Oct. 22, 1935.  H. B. KRAFT  2,018,451
BRAKE TESTER
Filed June 30, 1931  6 Sheets-Sheet 2

INVENTOR
HARRY B. KRAFT
BY  ATTORNEY

Oct. 22, 1935.  H. B. KRAFT  2,018,451
BRAKE TESTER
Filed June 30, 1931   6 Sheets-Sheet 3

INVENTOR
HARRY B. KRAFT
BY
ATTORNEY

Oct. 22, 1935. H. B. KRAFT 2,018,451
BRAKE TESTER
Filed June 30, 1931   6 Sheets-Sheet 5
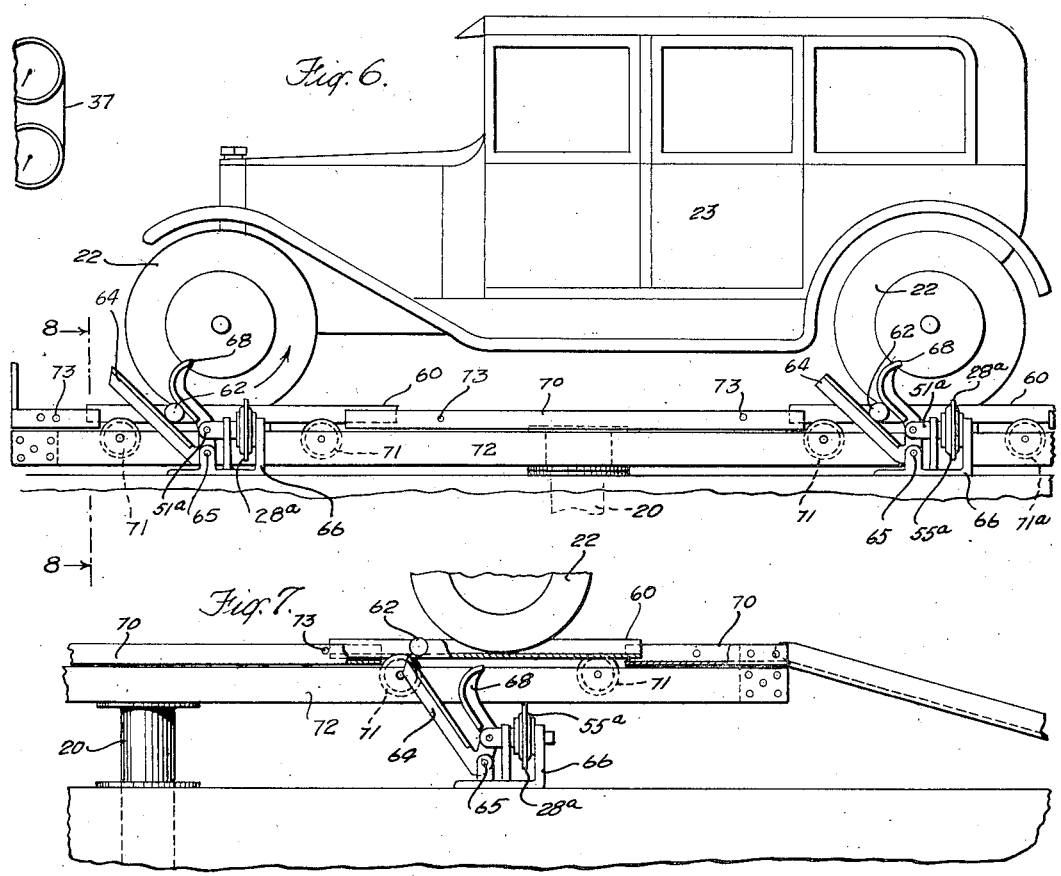
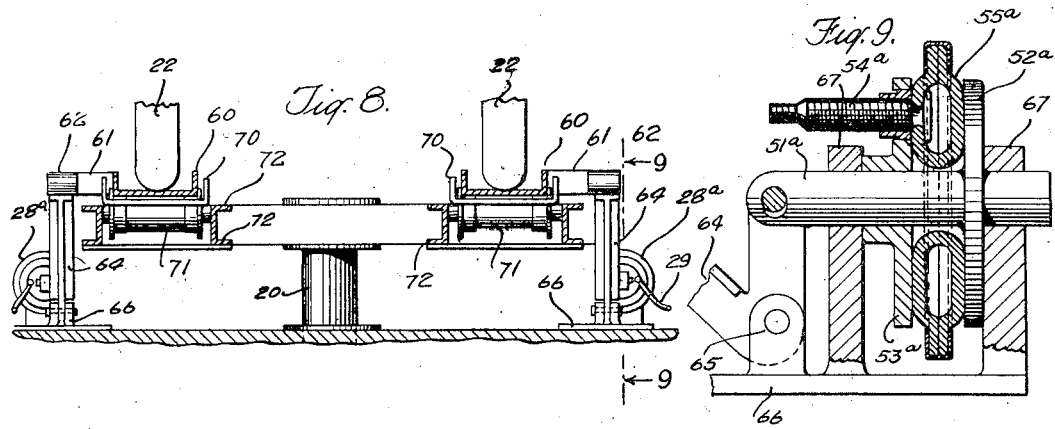
INVENTOR
HARRY B. KRAFT
BY   ATTORNEY Oct. 22, 1935.     H. B. KRAFT     2,018,451
BRAKE TESTER
Filed June 30, 1931     6 Sheets—Sheet 6
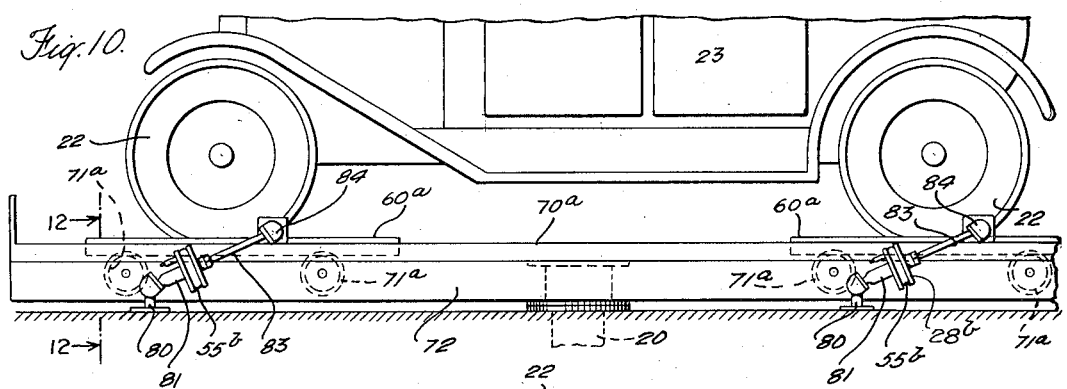
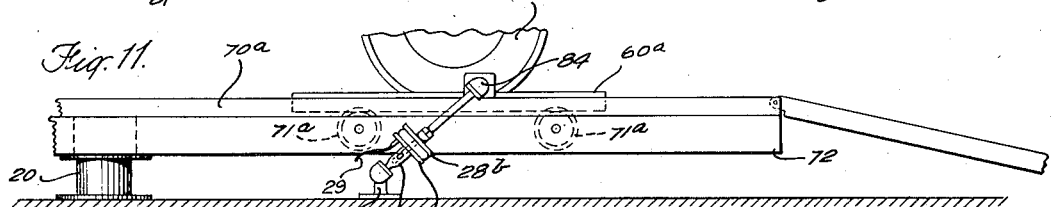
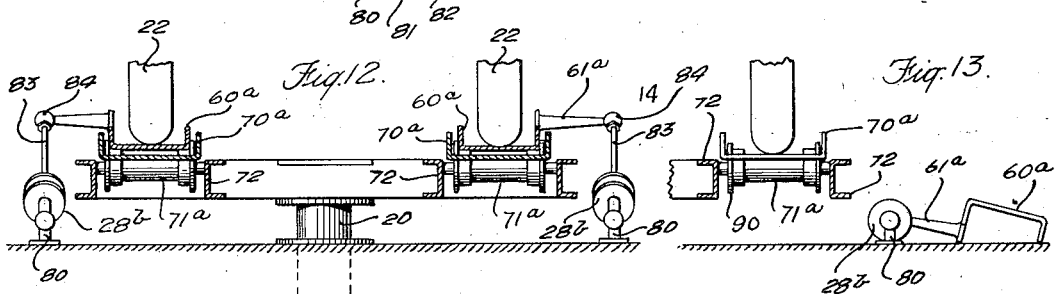
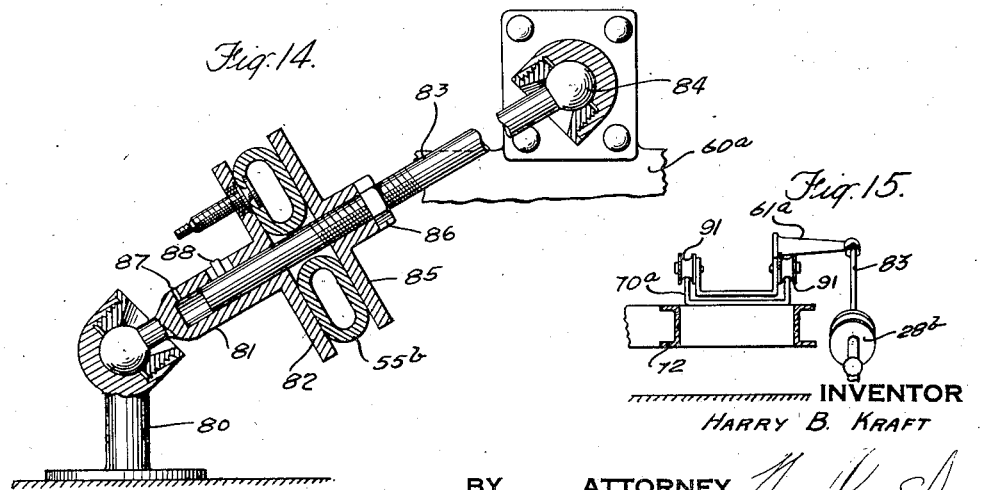
INVENTOR
HARRY B. KRAFT
BY ATTORNEY Patented Oct. 22, 1935

2,018,451

UNITED STATES PATENT OFFICE 2,018,451

BRAKE TESTER

Harry B. Kraft, Sharon, Pa., assignor to Bendix Cowdrey Brake Tester, Inc., a corporation of Delaware Application June 30, 1931, Serial No. 547,933

16 Claims. (Cl. 265—47)

This invention relates to an apparatus for measuring the turning resistance of the wheels of a vehicle, and more particularly for testing and measuring the effectiveness of vehicle brakes.

The numerous devices which have been suggested prior to my invention for testing of brakes, many of which have appeared on the market, may be grouped generally into two classes. These two classes correspond to the two methods of testing brakes which were used before the application of mechanical methods of brake testing. The quantitative test in the manual testing was to jack up the car, set the brake and turn the wheel by hand gauging by muscular perception its resistance to turning and the degree to which the brake pedal or lever has been operated. The relative test for comparing the braking effect on different wheels might be made by turning each in succession in this same way, comparing their resistances by muscular perception; or the car might be driven at a speed sufficient to slide the wheels and the brakes applied hard until one wheel slides on the pavement. This latter method, of course, serves only to indicate the relative braking, and gives no quantitative measurement of the braking effect except that on any wheel which slides, the braking effect is greater than its traction on the pavement.

Mechanical testing devices heretofore have to a large extent adhered to these same methods substituting accurate measuring devices for the cruder methods of the manual tests. Now, however, by departing from this prior practice and approaching the problem from a new angle, I have succeeded in developing a new class of testing devices, which are simple, efficient, convenient and economical, and which are better adaptable to the requirements of the general service or repair shop than the devices known to the prior art.

Thus it is an object of the present invention to provide a new type of brake tester which may be adapted to the equipment of any garage, and which will not monopolize space in such garage when the tester is not in use as such.

Another object of the invention is to provide testing equipment which will make it possible to work efficiently and conveniently while making adjustments in the brake linkage without removing the car from the tester and without provision of an expensive pit.

Another object of the invention is to provide a type of tester which will be subject to a minimum of depreciation and deterioration with age and use.

Another object is to provide a tester which will measure accurately not only the relative braking effect of the different wheels, but which will also measure accurately and quantitatively the braking effect at each wheel independently.

In the accompanying drawings I have shown illustrative examples of various ways in which my invention may be embodied.

Figure 2:
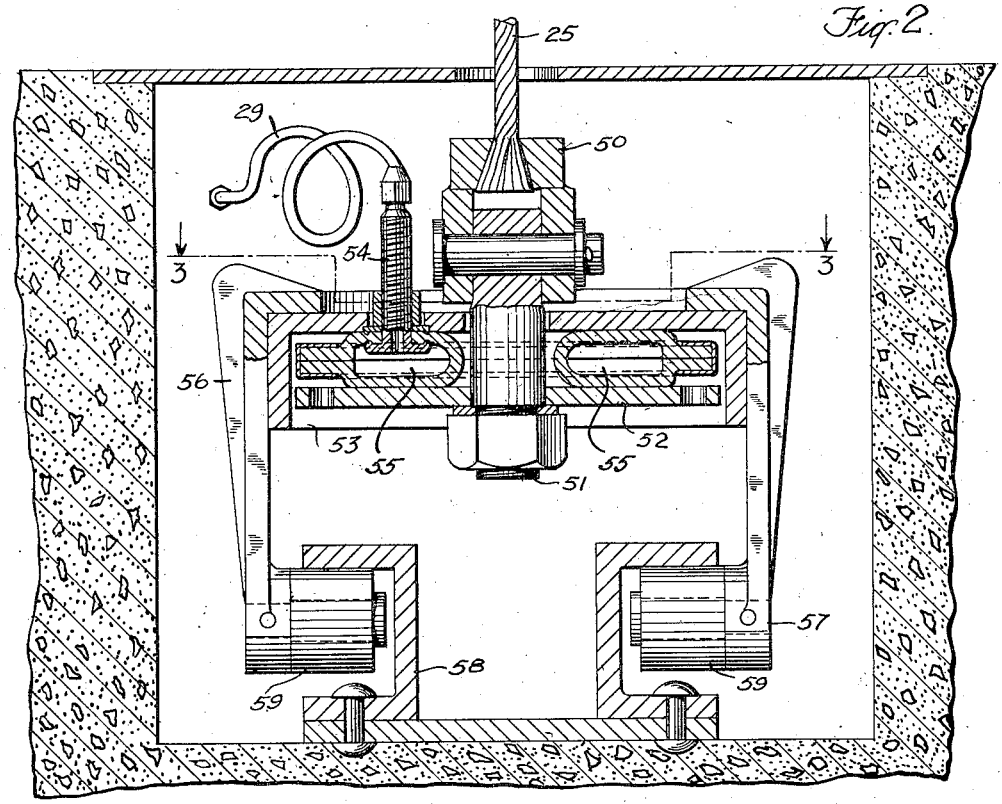
Figure 3:
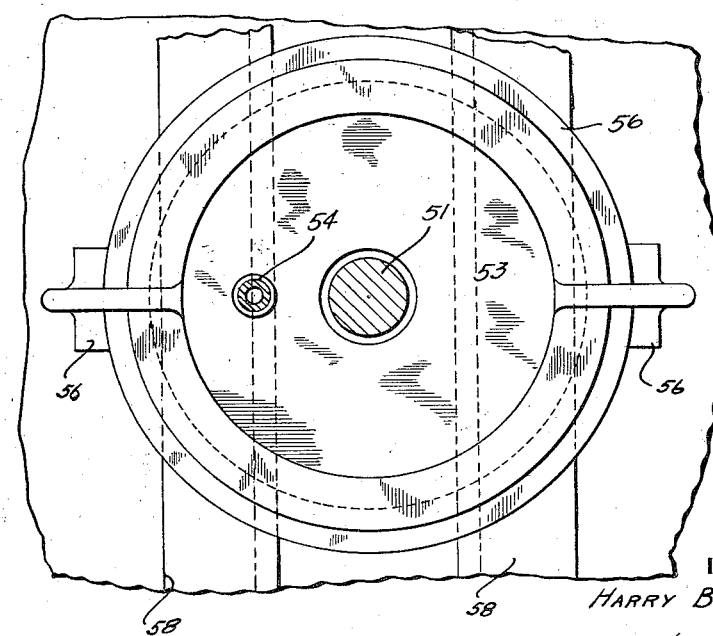
Figure 4:
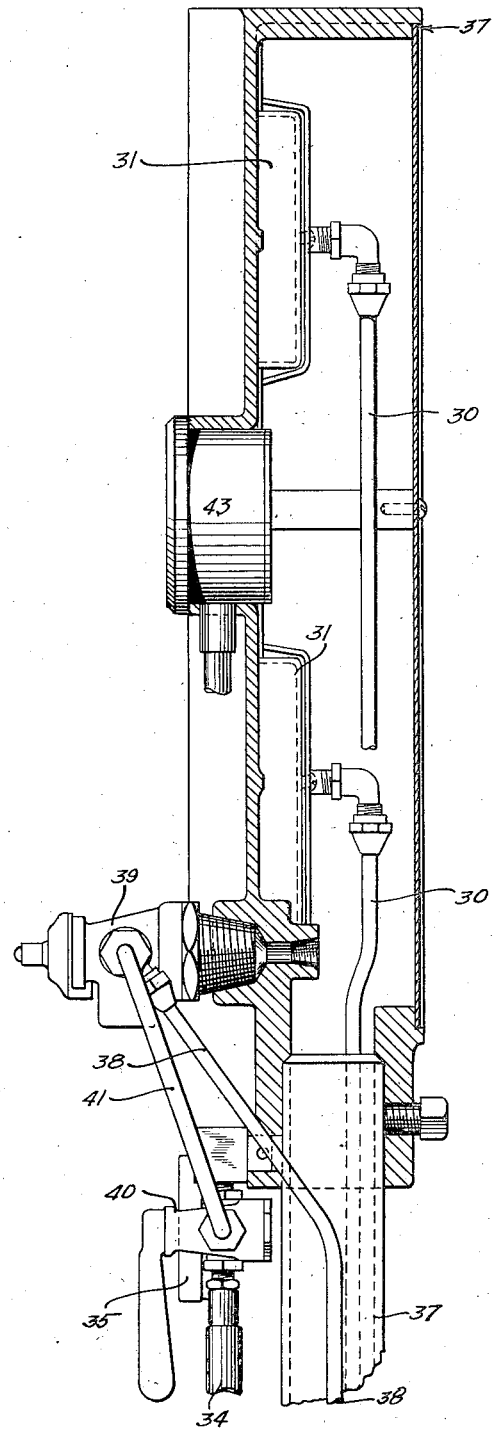
Figure 5:
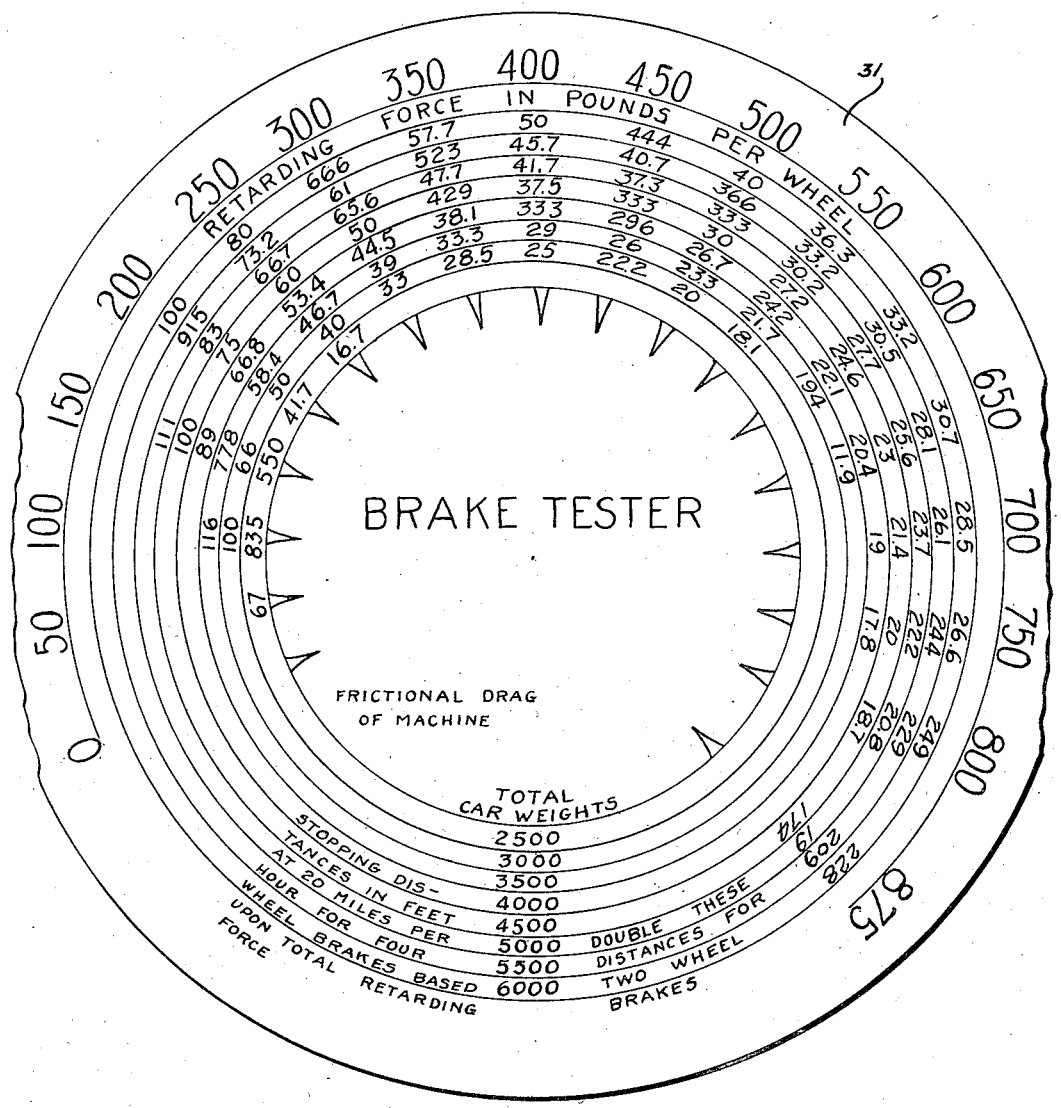

Fig. 1 being a side elevation of a brake tester constructed according to my invention and showing a car in the testing position thereon;

Fig. 2 being a more detailed view in vertical section of one of the measuring units of the device shown in Fig. 1;

Fig. 3 being a cross-section taken on line 3—3 of Fig. 2;

Fig. 4 being a vertical section through the indicating control unit shown at the left of Fig. 1;

Fig. 5 showing a dial used in the indicating unit shown in Figs. 1 and 4;

Fig. 6 being a view in side elevation of another embodiment of the invention;

Fig. 7 being a more detailed view, partly in section, of one end of the testing device.

Fig. 8 being a view in cross-section taken on line 8—8 of Fig. 6.

Fig. 9 being a view of the pressure responsive member in cross-section taken on line 9—9 of Fig. 8.

Fig. 10 being a view in side elevation of another embodiment of my invention.

Fig. 11 being a view of one end of the same embodiment.

Fig. 12 being a view in cross-section taken on line 12—12 of Fig. 10.

Fig. 13 being a fragmentary view similar to Fig. 12, showing the brake testing unit laid aside.

Fig. 14 showing the pressure responsive member in vertical section taken on line 14—14 of Fig. 12.

Fig. 15 being a fragmentary view similar to Fig. 12, but showing a modified form of a similar embodiment.

Referring first to Figs. 1 to 5, I have indicated by the numeral 20 a hydraulic lift commonly known as a free wheel lift, which is a usual piece of equipment in automobile service stations. This lift has a horizontal platform or frame 21, which is sufficiently narrow to pass between the wheels 22 of an automobile 23 when it is driven over the lift, and which is sufficiently long simultaneously to engage the front and rear wheel axles of an automobile. Accordingly, when a car is raised by means of this lift, it is held upon its axles and the wheels are free to rotate. This lift, it will be understood, is in itself no part of my invention, but has been in common use prior to my invention, and it is an advantage of my invention that I am able to use this standard equipment without in any way impairing its utility for its other uses.

According to my invention a lift e. g. of a type described above is combined with pressure responsive units and wheel engaging units such that when the car is moved vertically, such movement is resisted by a force applied to the wheels so as to create a turning moment thereon, and this force is measured by the pressure responsive units.

In the embodiment shown in Fig. 1, the wheels are engaged by flexible bands 25, which are secured at one end to the periphery of the wheel, e. g., by means of the yoke 26, which is secured against the felloe of the wheel, or between the spokes, e. g., by means of a suitable clamp 27. The other end of the flexible band 25 is secured to a pressure responsive device 28, which includes a compressible fluid container, more fully described below. This container is connected by means of a flexible hose or pipe 29 and by means of any suitable pipe or hose 30 to a dial indicator 31 for indicating the fluid pressure in said container.

In the embodiment illustrated in Fig. 1, each of the wheels is connected to a separate pressure responsive device 28, and through it to a separate dial indicator 31. I have found this arrangement preferable, since it permits of a clearer indication of the exact resistance of each wheel, as well as of their relative resistance.

A fluid operated pedal depresser 33 is advantageously provided in order to hold the brake pedal depressed to any desired extent. This pedal depresser 33 is connected by a suitable hose or pipe 34 to a pressure indicating dial 35.

For convenience in operation of the brake tester all of the indicating dials and operating valves are mounted on a single pedestal 37. A suitable fluid under pressure is conducted to this pedestal by means of a pipe 38 from a pump or a reservoir in which such fluid is maintained under suitable pressure, from which it is received by the 3-way valve 39 for controlling the lift and by the 3-way pedal depresser valve 40 through the branch pipe 41. The pipe 42 from the valve 39 conducts the pressure fluid to the lift operating cylinder, and this pipe 42 is connected also with the pressure indicating dial 43. This dial serves to indicate the weight of the car being lifted by indicating the fluid pressure required to balance the car on the lift.

The weight indicating dial 43 enables the operator, without any separate operation, to interpret the indications on the dial 31 in terms of stopping distances, as well as in retarding force. This is accomplished, for example, by means of a dial face such as is shown in Fig. 5, in which the stopping distances for a given speed are arranged on angular positions corresponding to the retarding force and radial positions corresponding to the car weight. Thus, with the car weight indicated directly by the dial 43, the operator may at once read from the angular position of the indicator on this dial the stopping distance for the particular car, or deceleration in other terms similarly arranged upon the dial.

The pressure responsive device 28 which I have found most satisfactory and which I have illustrated in this preferred embodiment is shown in greater detail in Figs. 2 and 3. As there illustrated, the flexible member 25 which engages the periphery of the wheels 22 is secured at one end to the yoke 50, which, in turn, is pivoted on the central bolt 51. This bolt, at its lower end, carries a circular plate 52, which is mounted within a cylindrical member 53. The cylindrical member 53 is open at its bottom end for the reception for the plate 52 and at its top is drilled centrally to receive the bolt 51 with substantial clearance, and at another point to receive the stem 54 of the pressure chamber 55. This pressure chamber 55 as shown is preferably made of rubber or of a rubberized fabric. It may, however, be made of any material which is sufficiently flexible to introduce relatively little error due to its own resistance to flexing, and which will not be subject to objectionable fatigue because of repeated flexing.

The cylinder 53 is supported at its upper edge by means of the frame 56, which is pivoted at 57 to the base 58, which is anchored to the concrete foundation 59. The base member 58 may be a simple yoke, as shown at the rear wheel member in Fig. 1, or as shown beneath the front wheels in Fig. 1. This base member may constitute a track of substantial length, on which the pressure responsive member is mounted by means of rollers 59. In the preferred embodiment, a track is used at one end to accommodate differences in wheel-base of different automobiles, and a simple yoke is used at the other end. In some cases, however, as e. g., where there is little leeway in the positioning of the car upon the lift, it may be advantageous to use a track at both ends, whereas in other cases, to avoid expense, the simple yoke may be used at both ends, in which case the pull on member 25 will be not quite vertical. This, however, need not be seriously objectionable.

In operation of the device as above described, the lift is first lowered so that the frame or platform 21 lies close to the ground, and aligned between the pressure responsive members 28. The car is then driven over the lift so that its wheels straddle the frame 21, and so that the front edges of the rear wheels are positioned substantially vertically above the rear wheel pressure responsive members 28. The flexible members 25 are then wrapped around the wheels 22, advantageously after raising the lift slightly, e. g., to the position shown in Fig. 1 and the yokes 26 are secured to the wheels.

The operator then steps to the pedestal 37 and opens the pedal depresser valve 40 until the gauge 35 shows a pressure on the pedal approximately equal to the pressure which would be readily applied by an operator when stopping the car. The valve 40 is then closed and the valve 39 is opened slowly. The weight of the car will be indicated upon the dial 43 whenever the lift is at rest with the wheels free from the ground and the flexible members 25 slack. As the pressure increases, the flexible members 25 will be drawn taut, and pressure will be exerted upon the pressure chambers 55 of the pressure responsive members 28. This pressure will be transmitted through lines 29—30 to the respective indicators 31, and these indicators will rise gradually as the lifting force applied to the vehicle increases, each indicator rising until its wheel begins to slip in its brake. When a wheel slips, the pressure exerted on the fluid through the flexible member 25 no longer increases with increased lifting force, and instead the car will be raised. If one wheel yields before the others, any additional force exerted by the lift will be resisted by the other three, and the force upon them will be increased accordingly until one of them slips in its brake, after which additional force will be taken by the other two, and so on until all four of the wheels have slipped. The operator, by watching the dials during this operation, can observe both the maximum pressure for each wheel and any variations as the wheel turns, these variations indicating, of course, differences in braking effect at the different angular positions of the wheel, e. g., such as result from the brake drum being out of round or eccentric. By using a band 25 of sufficient length, the wheels may be turned through substantially a complete revolution, thus indicating any variations in resistance at any angular position of each wheel.

At the end of the test, the car will be in a raised position and the operator has merely to close the valve 39 and step under the car to adjust the brakes. The car being in a raised position, this may be readily done without stooping or crawling, and with maximum convenience. When the adjustment is completed, the operator returns to the pedestal 37, lowers the car by turning the 3-way valve 39 so that the pipe 42 is open to the atmosphere until the wheels just clear the ground. He then releases the pedal depresser 33 by turning the valve 40 so as to open the pipe 34 to the atmosphere, returns to the car, rotates the wheels so as to wind the bands 25 over their periphery, and is ready for a repetition of the test.

The flexible pressure chambers 55 in this embodiment of the invention may contain a fluid at any pressure below that resulting from the test. Either liquid or gas may be used. If a gas, e. g., air, is used it is preferably at a pressure above atmospheric, so as to reduce the movement between the parts in the pressure responsive device 28. A proper inflation will be indicated by the position of the hand on the corresponding indicators 31, when the band 25 is slack. If the pressure should fall below that corresponding to the zero point on the indicator, additional pressure may be introduced by means of a suitable valved connection into the line 30—29—54.

In the embodiment described above, the testing is done by force applied directly to the lift during its upward movement. My invention, however, is not limited to such a device, nor is it limited to the use of a free wheel lift. Thus, for example, I have shown in Fig. 6 another embodiment in which the force required for testing the brakes is the force of gravity acting upon the weight of the car. In this case, the car, after being raised in any suitable manner, preferably by means of a hydraulic lift, is released onto the chairs 60, which engages the periphery of the wheels, and which is mounted to permit the horizontal movement parallel to the car. From one side of each chair extends an arm 61 having on its end a roller 62. This roller rides on the surface of cam member 64, which is pivoted at 65 to the base 66, the latter being anchored to the concrete, or other foundation. The cam member 64 also pivotally engages the end of a rod 51a, which is slidably mounted in the trunnions 67 of the base member 66, and which is provided, near its other end, with a plate 52a, which in the present instance is shown as integral, but which obviously may be secured thereto in any other suitable way. This plate 52a bears against the fluid pressure container 55a which, in turn, bears against the plate 53a, the latter having suitable openings for the rod 51a and for the stem 54a of the fluid pressure container. The latter is connected, e. g., as in the embodiment shown in Fig. 2 to the members or pipe 29.

The upper arm 68 of the cam member 64 is formed so as to provide a wider entering mouth for the roller 62, and a narrower passage beyond such entering mouth.

The lift used in this case is preferably not of the free wheel type, but of the type having channels 70 onto which the car is driven, and in this case the chairs 60 are preferably mounted with their ends telescoped into the channels 70. Rollers 71 mounted on frame 72 of the lift support the chairs 60 so as to permit free longitudinal movement, and to prevent binding of the chair against the sides of the channel.

Pins 73 are secured in the sides of the channels 70 to limit the movement of the chairs therein.

In the operation of the embodiment shown in Figs. 6 to 9, the lift is first lowered so that the rollers 62 are substantially at the bottom of the cam slots in the cam member 64. The car is then driven onto the lift until its wheels rest near the middle or the front end of the chairs 60. The car is then secured e. g. by its axle to the frame of the lift so as to substantially prevent horizontal movement of the car bodily on the lift. This may be accomplished by any of the means well known to the art, such as are commonly used in the brake testers. The operator then steps to the control and indicating part used, which in this case may be substantially the same as that shown in Fig. 1. With the brakes released, the lift is raised until the rollers 62 just clear the upper arms 68 of the cams 64. The cam arms 68, acting upon the rollers 62 will move the chairs 60 forward and rotate the wheels. The brakes are then set, e. g., by a pedal depresser such as that shown in Fig. 1, and the pressure is slowly released from beneath the hydraulic lift, whereby the weight of the car is gradually transferred from the lift to the rollers 62, since the latter are now supported upon the inclined surface of the cam 64, the weight of the car will tend to move the chairs 60 toward the rear of the car, and consequently to turn the wheels. This force will also act upon the cam 64, tending to swing it on its pivot 65. This tendency, however, will be resisted by the pressure responsive member 28a, and the force with which it is resisted will be recorded upon the indicators 31.

When all of the wheels have been moved, the brakes may be released and the lift raised as far as is necessary for working conveniently while adjusting the brakes. With the adjustment complete, the operator returns to the pedestal 37, sets the brake and lowers the lift, thereby repeating the testing operation.

The embodiment of my invention shown in Figs. 6 to 9 is possessed of the advantage that the vertical force utilized in testing is the weight of the car itself, and thus the adjustment may be correlated directly with the weight of the car, for example, by adjusting each of the brakes so that its wheel turns only when substantially the entire weight of the car is carried upon the rollers 62. Furthermore, with this type of tester, it is impossible to exert upon the axles of the car any force greater than that for which they are designed.

In Figs. 10 to 15, I have indicated still another embodiment of my invention. In this case, the chairs 60a are similar to the chairs 60 of Figs. 6 to 9, and the lift is similar to the lift shown in Figs. 6 to 9, except that the channels 70 are preferably made continuous beneath the chairs 60a, so that these chairs may be thrown to one side, and still leave the lift in condition to be used exactly as though it did not have associated with it any brake testing mechanism. In this case, however, the means for effecting horizontal movement is a pivoted arm 28b, which includes the pressure responsive means. As shown most clearly in Fig. 14, the pressure responsive unit 28b consists of a base 80 anchored to the concrete or other foundation. The space 80 is formed with a spherical socket in which is secured a ball end of the abutment member 81, having an abutment disc 82 which, in the present instance, is shown integral with the rest of the abutment member 81. This member 81 is also built for the reception of the end of the rod 83, the opposite end of which is made in the form of a ball received in a spherical socket 84 in the arm 61a of the chair 60a. On this rod 83 is a disc 85, which may be made integral therewith, or may be threaded thereon, e. g., against the abutment 86. A vent hole 87 is provided near the end of the bore in the member 81, in order to permit the ready escape of trapped air, and a suitable stop 88 is provided to limit the withdrawal of the rod 83 from the member 81. Between the discs 85 and 82 is the pressure chamber 55b.

The chairs 60a are carried in the embodiment shown in Figures 10 to 13 upon the rollers 71a, which in the present instance are mounted beneath the channels 70a, but have flanges 90 near their ends which extend through slots in the channels 70a and form a bearing for the chairs 60a. In the embodiment shown in Fig. 15, these rollers 71a are replaced by rollers 91 secured to the sides of the chairs themselves. In this case, the vertical sides of the channel 70a serve as tracks upon which the rollers 91 may travel.

In the operation of this embodiment of my invention, the chairs are first positioned within the channels 70a upon the rollers 71a, or with their rollers 91 upon the sides of the channel 70a, as shown in Figs. 10, 11, 12 and 15. The car is then driven onto the lift and secured thereon against horizontal movement, as described in connection with Figs. 6 to 9. With the brakes released, the lift is raised until the member 28b is at an angle of e. g. about 60 degrees to the horizontal. As the lift is raised, this member 28b will describe an arc which will cause the chairs 60a to move horizontally forward. The brakes are now set and the pressure released from the lift.

As the lift settles, the weight of the car is gradually transferred to the member 28b in the same manner as, in the embodiment shown in Fig. 6, it was transferred to the cam member 64 and the increasing pressure upon this member will be recorded upon the indicating dials 31.

The extent to which the lift may be raised without moving the car off of the chairs 60a is limited by the members 28b. Accordingly, it is desirable to make these members of sufficient length to permit the raising of the car to a height at which it will be convenient to make adjustments upon the brake mechanism.

When the lift is to be used for other purposes than the testing of brakes, and particularly when the chairs 60a or the members 28b would interfere with a use to which the lift is to be put, the chairs may be lifted out of the channels 70a and thrown to one side, as shown in Fig. 13.

In the embodiments of Figs. 6-15, there is a variation in advantage as the lift settles. The indication on the dials 31 will therefore be accurate only for comparing the braking on the various wheels, unless the faces of the dials are designed to show the positive braking effort for various positions of the members 61 or 61a, and the braking effort at each wheel will be indicated only approximately, or the cams 64 of Figs. 6–9 may be designed to compensate for the change in mechanical advantage.

Although I have illustrated in the drawings and have described above several embodiments of my invention, and certain modifications thereof, I have not attempted to describe exhaustively all of the various ways in which the invention may be practiced and, on the contrary, many other ways than those shown will at once be suggested to those skilled in the art by the above disclosure, and are included within the scope of my invention.

I claim:—

1. An apparatus adapted for testing vehicle brakes, comprising a lift for said vehicle adapted to engage the vehicle without engaging its wheels, fluid pressure means for operating said lift, means engaging the periphery of the wheels of said vehicle when positioned on the lift adapted to resist vertical movement of the vehicle by a force acting upon the wheel so as to create a turning moment thereon, and means associated therewith for measuring the force thus exerted upon the wheels as each wheel turns.

2. An apparatus adapted for testing vehicle brakes, comprising a free wheel lift adapted to lift bodily a vehicle to be tested, a band adapted to be at least partially wound onto the periphery of each wheel of said vehicle, and to have one end secured thereto, anchored means for exerting a restraining force upon the other end of the band, a means connecting said other end of the band to said anchor and adapted to measure the force exerted therebetween.

3. An apparatus adapted for testing vehicle brakes, comprising a free wheel lift, means adapted to engage the periphery of each wheel of said vehicle near its horizontal diameter and to exert a tangential restraining force thereon, anchored means for exerting a restraining force on the other end of said wheel engaging means and means associated therewith adapted to measure the magnitude of the restraining force exerted upon said wheel.

4. An apparatus adapted for testing vehicle brakes, comprising means for moving the vehicle vertically and anchored means adapted to engage the wheels at their periphery and by resisting the bodily movement of the vehicle to cause a turning moment on the wheel, and means for measuring the force with which the anchored means opposes the vertical movement at each wheel when it turns.

5. An apparatus as defined in claim 4, in which the means engaging the wheels are flexible straps at least partially wound on the periphery of the wheel.

6. An apparatus adapted for testing vehicle brakes, comprising means for effecting vertical movement of the vehicle, means for opposing such movement by a force exerted upon each vehicle wheel so as to create a turning moment thereon, and means for measuring each force as the wheel is turned thereby against the resistance of its brake.

7. An apparatus as defined in claim 4, in which means for measuring the resisting force includes means for indicating the measurement when the wheel has been moved a given angle.

8. An apparatus as defined in claim 4, in which means for measuring the resistance force comprises a confined fluid connection between means engaging the wheel and its anchor, and a fluid pressure gauge to measure the force exerted upon said confined fluid.

9. An apparatus adapted for testing vehicle brakes comprising means for moving the vehicle vertically, anchored means adapted to engage the wheels so as to exert thereon a force which resists the vertical movement of the vehicle, and thereby creates a turning moment on the wheel, and means for measuring the vertical force tending to move said vehicle when each wheel is turned.

10. An apparatus for testing vehicle brakes comprising a lift for moving the vehicle, means thereon for supporting and rotating the wheels of the vehicle against the resistance of their associated brakes, means connected to the wheel supporting and rotating means for measuring the resistance to rotation of the wheels, and means for operating the rotating means by force derived from movement of the lift.

11. An apparatus for testing vehicle brakes comprising a power operated lift for moving the vehicle, means on the lift for supporting and rotating the wheels of the vehicle against the resistance of their associated brakes, means for operating the wheel supporting and rotating means by force derived from movement of the lift, and means for measuring the resistance to rotation of the wheels.

12. An apparatus for testing vehicle brakes comprising a power operated lift for moving the vehicle vertically, movable members on the lift for supporting and rotating the wheels against the resistance of their associated brakes, means connected to the wheel supporting means for automatically moving the wheel supporting means upon movement of the lift and means operated by the last-mentioned means for measuring the resistance to rotation of the wheels.

13. An apparatus for testing vehicle brakes comprising a power operated lift for moving the vehicle vertically, longitudinally movable members on the lift for supporting and rotating the wheels against the resistance of their associated brakes, means connected to the wheel supporting means for automatically moving the wheel supporting means longitudinally upon movement of the lift and means operated by the last-mentioned means for measuring the resistance to rotation of the wheels.

14. An apparatus for testing vehicle brakes comprising a power operated lift for moving the vehicle, means thereon for supporting and rotating the wheels of the vehicle against the resistance of their associated brakes, means connected to the wheel supporting and rotating means for automatically moving the wheel supporting means upon movement of the lift and means connected in the last-mentioned means for measuring the resistance to rotation of the brakes.

15. An apparatus for testing vehicle brakes comprising a lift, means thereon for supporting and rotating the wheels of a vehicle against the resistance of their associated brakes, fixed supports adjacent the lift, links connecting the supports to the wheel supporting and rotating means whereby vertical movement of the lift causes longitudinal movement of the wheel supporting means, and means connected in the links for measuring the resistance to rotating of the respective wheels.

16. An apparatus for testing vehicle brakes comprising a lift for moving a vehicle, means on the lift for supporting and rotating the wheels of the vehicle against the resistance of their associated brakes, means for operating the rotating means receiving its power from the weight of the vehicle in descent, and means connected to the means for operating the wheel supporting and rotating means for measuring the resistance to rotation of the wheels.

HARRY B. KRAFT.